(12) United States Patent
Laurent et al.

(10) Patent No.: US 9,849,729 B2
(45) Date of Patent: Dec. 26, 2017

(54) TIRE CARCASS REINFORCEMENT FOR TWO-WHEELED VEHICLES

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Christophe Laurent, Clermont-Ferrand (FR); Pierre-Yves Formagne, Clermont-Ferrand (FR); Romain Bouchet, Clermont-Ferrand (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 337 days.

(21) Appl. No.: 14/411,844

(22) PCT Filed: Jun. 26, 2013

(86) PCT No.: PCT/EP2013/063360
§ 371 (c)(1),
(2) Date: Dec. 29, 2014

(87) PCT Pub. No.: WO2014/001379
PCT Pub. Date: Jan. 3, 2014

(65) Prior Publication Data
US 2015/0144241 A1    May 28, 2015

(30) Foreign Application Priority Data
Jun. 28, 2012 (FR) ...................... 12 56154

(51) Int. Cl.
*B60C 9/00* (2006.01)
*B60C 9/07* (2006.01)
(Continued)

(52) U.S. Cl.
CPC .................. *B60C 9/07* (2013.01); *B60C 9/18* (2013.01); *B60C 15/0009* (2013.01); *B60C 2200/10* (2013.01)

(58) Field of Classification Search
CPC .......... B60C 9/07; B60C 9/18; B60C 15/0009
(Continued)

(56) References Cited

U.S. PATENT DOCUMENTS

| 4,706,725 A | 11/1987 | Okuni et al. |
| 2006/0027310 A1* | 2/2006 | Auclair ............... B29D 30/246 156/133 |
| 2011/0030871 A1 | 2/2011 | Bestgen et al. |

FOREIGN PATENT DOCUMENTS

| CN | 1733455 | 2/2006 |
| DE | 21 64 366 | 6/1973 |

(Continued)

OTHER PUBLICATIONS

JPO machine translation of JP 07-017212, retrieved Jan. 18, 2017.*
(Continued)

*Primary Examiner* — Timothy Kennedy
(74) *Attorney, Agent, or Firm* — Cozen O'Connor

(57) ABSTRACT

A tire having a crown reinforcement (5), comprising at least one crown layer (51), and a carcass reinforcement (6), comprising at least one turned-up carcass layer (61), the turned-up carcass layer (61) comprising mutually parallel reinforcers turned up, within each bead, from the inside towards the outside of the tire around a bead wire (7), to form a turn-up (8) comprising a free end (E). The turned-up carcass layer (61) comprises a crown portion (611) and a (Continued)

lateral portion (612), the crown portion (611) extending axially between a first and a second end ($E_1$, $E'_1$) which is symmetric about the equatorial plane (P), the lateral portion (612) extending radially inwards, from a first end ($E_2$) as far as a second end (E3). The reinforcers of the lateral portion (612) and the reinforcers of the turn-up (8) form, with the circumferential direction (X), specified angles.

10 Claims, 2 Drawing Sheets

(51) Int. Cl.
     *B60C 9/18*        (2006.01)
     *B60C 15/00*      (2006.01)
(58) Field of Classification Search
     USPC .......................................................... 152/538
     See application file for complete search history.

(56)               References Cited

FOREIGN PATENT DOCUMENTS

| EP | 1 052 117 | 11/2000 |
| EP | 1 623 819 | 2/2006 |
| JP | S56 135304 | 10/1981 |
| JP | 07017212 A * | 1/1995 |
| JP | 2009113604 A * | 5/2009 |

OTHER PUBLICATIONS

JPO machine translation of 2009-113604, retrieved Jan. 18, 2017.*
Office Action dated Dec. 5, 2016 which issued in the corresponding Chinese Patent Application No. 201380033483.9.

* cited by examiner

TIRE CARCASS REINFORCEMENT FOR TWO-WHEELED VEHICLES

RELATED APPLICATIONS

This is a U.S. National stage of International application No. PCT/EP2013/063360 filed on Jun. 26, 2013.

This patent application claims the priority of French application no. 1256154 filed Jun. 28, 2012 the disclosure content of which is hereby incorporated by reference.

The invention relates to a radial tire intended to be fitted to a motorized two-wheeled vehicle such as a motorcycle or motorbike.

Although not limited to such an application, the invention will be described more particularly with reference to a radial tire intended to be mounted at the rear of a motorbike.

BACKGROUND OF THE INVENTION

In what follows, and by convention, the circumferential, axial and radial directions respectively denote a direction tangential to the tread surface of the tire in the direction of rotation of the tire, a direction parallel to the axis of rotation of the tire, and a direction perpendicular to the axis of rotation of the tire. "Radially on the inside or respectively radially on the outside" means "respectively closer to or further away from the axis of rotation of the tire". "Axially inside and respectively axially outside" mean "respectively closer and further away from the equatorial plane of the tire", the equatorial plane of the tire being the plane that passes through the middle of the tread surface of the tire and perpendicular to the axis of rotation of the tire. Angles with respect to the circumferential direction which are mentioned hereinbelow are indicated in terms of their absolute value disregarding their orientation.

A tire comprises a tread which is intended to come into contact with the ground via the tread surface and is connected by two sidewalls to two beads that provide the mechanical connection between the tire and the rim on which it is mounted.

A radial tire also comprises a reinforcement comprising a crown reinforcement, radially on the inside of the tread, and a carcass reinforcement, usually radially on the inside of the crown reinforcement.

The crown reinforcement of a radial tire for a motorbike generally comprises at least one crown layer made up of reinforcers coated in a polymer material of the elastomer type. The reinforcers are usually made up of a textile material such as aramid, but may also be made of metals. Various crown reinforcement architectures have been proposed by those skilled in the art according to whether the tire is intended to be fitted at the front or fitted at the rear of the motorbike. For fitting at the front, the crown reinforcement usually comprises at least two working crown layers, comprising reinforcers that are substantially mutually parallel within each layer and crossed from layer to the next, forming, with the circumferential direction, angles generally of between 15° and 35°. The working crown layers may be associated with at least one circumferential crown layer, comprising circumferential reinforcers, i.e. forming, with the circumferential direction, a substantially zero angle, at most equal to 5°. This circumferential crown layer is generally obtained by helical winding of a strip of at least one elastomer-coated reinforcing element. For fitting at the rear, the crown reinforcement is usually made up of a circumferential crown layer.

The carcass reinforcement of a radial tire for a motorbike generally comprises at least one carcass layer made up of reinforcers usually made of a textile material and coated in a polymeric material of the elastomer type. A carcass layer may have a turn-up or no turn-up.

A carcass layer is said to have a turn-up when it comprises a main part, connecting the two beads together and turned up, within each bead, from the inside of the tire outwards around a bead wire to form a turn-up with a free end. The bead wire in a circumferential reinforcement element, usually made of metal, and coated in a material generally elastomeric or textile. In the case of a carcass layer with a turn-up the turn-up, within each bead, anchors the carcass layer comprising it to the bead wire. The portion of bead wire in contact with the turned-up carcass layer contributes, particularly on inflation, to the ability of the turned-up carcass layer to absorb tension forces through coupling. This contribution to the absorption of tension forces is dependent on the torsional rigidity of the bead wire and on the geometry of the turn-up. If the bead wire has high torsional rigidity, the tension forces on inflation are essentially absorbed by the bead wire, with the turn-up playing a secondary role. If the bead wire has a lower torsional rigidity then the tension forces are absorbed both by coupling with the bead wire and by shearing between the turn-up and the materials adjacent to it, entailing a turn-up that is sufficiently long, namely the end of which is sufficiently radially distant from the radially innermost point of the bead wire. A turn-up is said to be long when the radial distance between its end and the radially innermost point of the bead wire is at least equal to 0.3 times the design section height of the tire as defined by the European Tire and Rim Technical Organisation or ETRTO standards.

A carcass layer has no turn-up when it is made up only of a main part connecting the two beads together, without being turned up around a bead wire. In the case of a carcass layer with no turn-up, each of the two end portions of the said carcass layer with no turn-up may be coupled either with the turn-up of at least one carcass layer that does have a turn-up, or with the main part of at least one carcass layer that does have a turn-up. Coupling means an area of overlaps between the carcass layer with no turn-up and a carcass layer with a turn-up, that allows tension forces to be absorbed in shear.

The reinforcers of the main part of a carcass layer with or without a turn-up are substantially parallel to one another and form, with the circumferential direction, an angle of between 65° and 90°.

A first known radial tire design for fitting at the rear of a motorbike comprises a carcass reinforcement made up of a carcass layer with a turn-up and a carcass layer without a turn-up, radially on the inside of a crown reinforcement consisting of a circumferential crown layer. The carcass layer without a turn-up is axially on the outside of the main part of the carcass layer with a turn-up but axially on the inside of the turn-up of the carcass layer with a turn-up. The turned-up end of the turned-up carcass is radially on the inside of the end of the circumferential crown layer, which means there is no overlap between the turn-up of the carcass layer with a turn-up and the circumferential crown layer. The respective reinforcers of the carcass layer with a turn-up and of the carcass layer without a turn-up form, with the circumferential direction, angles that are substantially equal in terms of absolute value, of opposite sign and comprised between 65° and 85°. Such a design, because of the triangulation effect resulting from the crossing of the reinforcers from one carcass layer to another, particularly in the side walls, guarantees the motorbike satisfactory stability when following a curved path. The camber angle of the rear tire, between the equatorial plane of the tire and the plane perpendicular to the ground and tangential to the path, is usually at least equal to 30° in a curved path.

A second known design of radial tires for mounting at the rear of a motorbike comprises a carcass reinforcement consisting of a single carcass layer with a turn-up, radially on the inside of a crown reinforcement consisting of a circumferential crown layer. The end of the turn-up of the turned-up carcass is radially on the inside of the end of the circumferential crown layer, which means there is no overlap between the turn-up of the carcass layer with a turn-up and the circumferential crown layer. The reinforcers of the carcass layer with a turn-up form, with the circumferential direction, an angle close to 90° and in practice comprised between 80° and 90°. Such a design, because of the coupling between the radial carcass layer and the circumferential crown layer in the crown region of the tire, guarantees the motorbike satisfactory stability when following a path in a straight line. When a path follows a straight line, a motorbike is usually travelling at high speed, at least equal to 150 km/h.

SUMMARY OF THE INVENTION

One object of the invention is to provide a radial tire carcass reinforcement for fitting at the rear of a motorbike, that allows the motorbike to be guaranteed satisfactory stability both when following a straight path at high speed and when following a curved path with a high camber angle.

This object has been achieved, according to one aspect of the invention, by a tire for a motorized two-wheeled vehicle of the motorbike type, comprising:

a tread connected by two sidewalls to two beads, a crown reinforcement, radially on the inside of the tread, comprising at least one crown layer, a carcass reinforcement, radially on the inside of the crown reinforcement, comprising at least one turned-up carcass layer, the turned-up carcass layer comprising mutually parallel reinforcers turned up, within each bead, from the inside towards the outside of the tire around a bead wire, to form a turn-up comprising a free end, the turned-up carcass layer comprising a crown portion and a lateral portion, the crown portion extending axially between a first and a second end which is symmetric about the equatorial plane of the tire, the lateral portion extending radially inwards, from a radially outermost first end, radially on the inside of the free end of the turn-up, as far as a radially innermost second end, radially on the inside of the radially innermost point of the bead wire, the reinforcers of the crown portion forming, with the circumferential direction, a substantially constant angle at least equal to 65°, the reinforcers of the lateral portion forming, with the circumferential direction, an angle that increases, from the radially outermost first end to the radially innermost second end from an angle at least 5° smaller than the substantially constant angle formed by the reinforcers of the crown portion, and the reinforcers of the turn-up forming, with the circumferential direction, an angle which is equal in terms of absolute value to, and of opposite sign from, the angle formed by the reinforcers of the lateral portion.

The turned-up carcass layer comprises a crown portion connected, on each side of the equatorial plane of the tire, in each sidewall, to a lateral portion via a transition portion, the lateral portion being continued, in each bead, by a turn-up.

The crown portion extends axially between a first and a second end, which are symmetric about the equatorial plane of the tire. The equatorial plane of the tire is the plane passing through the middle of the tread surface and perpendicular to the axis of rotation of the tire. In other words, the crown portion is centred on the equatorial plane of the tire. The crown portion is positioned radially on the inside of the crown reinforcement and its ends are axially on the inside of the ends of the tread surface, namely the axial width of the crown portion is less than the axial width of the tread.

According to an embodiment of the invention, the reinforcers of the crown portion form, with the circumferential direction, a substantially constant angle at least equal to 65°, namely comprised between 65° and 90° in terms of absolute value.

This angling of the reinforcers of the crown portion, said to be substantially radial, gives the tire low cornering stiffness. Cornering stiffness is the lateral force generated by the tire or drift thrust, when a sideslip angle of 1° is applied to it, the sideslip angle being the angle formed by the straight line that is the intersection of the equatorial plane of the tire with the ground, and the straight line tangential to the path followed. This substantially radial angling thus contributes to obtaining a crown that is flexible generating low drift thrust, and this contributes to guaranteeing that the motorbike maintains good stability when following a straight-line path.

The lateral portion extends radially inwards, from a radially outermost first end, radially on the inside of the free end of the turn-up, to a radially innermost second end radially on the inside of the radially innermost point of the bead wire. Its radially outermost end is not directly connected to an end of the crown portion but is connected to a transition portion that forms the transition between the said lateral portion and the crown portion. Its radially innermost end is positioned facing the radially innermost point of the bead wire and is connected to the turn-up. This lateral portion is positioned axially on the inside of the turn-up.

According to an embodiment of the invention, the reinforcers of the lateral portion form, with the circumferential direction, an angle that increases, from the radially outermost first end to the radially innermost second end from an angle at least 5° smaller than the substantially constant angle formed by the reinforcers of the crown portion. This variation in angle is continuous.

The transition portion, that is intermediate between the crown portion and the lateral portion, in each sidewall, comprises reinforcers forming, with the circumferential direction, an angle that decreases continuously from a first end of the said transition portion, connected to the crown portion, to a second end of the said transition portion, connected to the lateral portion.

The reinforcers of the turn-up form, with the circumferential direction, an angle that is equal in terms of absolute value to, and of opposite sign from, the angle formed by the reinforcers of the lateral portion. The lateral portion is axially on the inside of the turn-up and facing the turn-up. The angle formed, with the circumferential direction, by the reinforcers of the turn-up, decreases, in terms of absolute value and continuously, from the end radially on the inside of the turn-up, facing the radially innermost point of the bead wire, to the radially outer free end of the turn-up. As a result, the carcass reinforcement in this lateral region is made up at least of the lateral portion and of the turn-up opposite, the respective reinforcers of which are crossed, with respect to the meridian plane containing the axis of rotation of the tire, at angles that are equal in terms of absolute value and of opposite signs.

The crossing of the respective reinforcers of the lateral portion and of the turn-up leads to high cornering stiffness of the tire when the tire, following a curved path, is at a high camber angle, at least equal to 30°. The camber angle is the angle formed by the equatorial plane of the tire with the plane perpendicular to the ground and tangential to the path followed. At high camber angles, the carcass reinforcement portion consisting of the lateral portion and the turn-up is plumb with the area of contact of the tire with the ground. As a result, the portion of tire in contact with the ground has a relatively high rigidity. The tire therefore generates high thrust, guaranteeing the motorbike good stability when following a curved path.

Thus, the existence of two carcass layer portions, these respectively being substantially radial at the crown and crossed with the turn-up at the sidewall, enables the motorbike to be guaranteed good stability respectively in a straight line, for a zero camber angle, and in a curve, with a high camber angle at least equal to 30°.

Advantageously, the substantially constant angle formed, with the circumferential direction, by the reinforcers of the crown portion, is at least equal to 80°. An angle at least equal to 80°, and therefore close to 90°, gives the motorbike optimum stability in a straight line.

Advantageously too, the crown portion has an axial width at least equal to 0.3 times and at most equal to 0.9 times the width of the tread. This range of values makes it possible to have a crown portion which is wide enough, but not excessively wide, with respect to the tread surface, so that the carcass reinforcement portion plumb with the area of contact with the ground, in a straight line and for zero camber angles, is radial.

Advantageously also, the angle, formed, with the circumferential direction, by the reinforcers of the lateral portion, increases from a minimum angle of between 45° and 80°, to a maximum angle of between 55° and 85°. The choice of the variation in angle of the reinforcers of the lateral portion makes it possible to adjust the rigidity of the carcass reinforcement portion plumb with the area for contact with the ground, in a curve and for high camber angles, at least equal to 30°, so as to obtain optimum motorbike stability in a curve. Furthermore, the variation in angle of the reinforcers of the lateral portion is dependent on the substantially constant angle chosen for the reinforcers in the crown portion.

The lateral portion advantageously has a radial height at least equal to 0.5 times and at most equal to 0.9 times the design section height of the meridian section of the tire. This radial height governs the axial width of the carcass reinforcement portion plumb with the area of the contact with the ground in a curve and at high camber angles, at least equal to 30°. This feature is a parameter by means of which the cornering stiffness is adjusted for riding in curves with high camber angles.

According to one particular embodiment, the carcass reinforcement further comprises a carcass layer without a turn-up, of which the reinforcers form, with the circumferential direction, an angle at least equal to 65°, axially on the outside, in the sidewall, of the carcass layer with a turn-up and axially on the inside, in the sidewall, of the turn-up thereof. According to this particular embodiment, the rigidity levels are increased in comparison with a carcass reinforcement having a single carcass layer with a turn-up. In this configuration, the crown portion of the carcass reinforcement comprises two substantially radial carcass layers whereas the lateral portion of carcass reinforcement comprises three carcass layers, made up axially from the inside to the outside of the lateral portion of the carcass layer with turn-up, the turn-up of the carcass layer with a turn-up and the lateral portion of the carcass layer with no turn-up.

The reinforcers of a carcass layer are made of textile, preferably of polyester or of nylon. These materials are commonly used in the field of motorbike tires because of the advantageous compromise between their performance and their cost of manufacture. Aramid, which is a textile material with even better performance in terms of elastic modulus and rupture strength may be used in high-performance tires, such as tires for competition bikes.

According to one preferred embodiment, the crown reinforcement comprises a circumferential crown layer comprising circumferential reinforcers forming, with the circumferential direction, an angle at most equal to 5°. A circumferential crown layer is commonly used in a tire intended to be fitted to the rear of a motorbike in order to increase the circumferential stiffness of the tire and thus allow it to achieve high speeds without becoming excessively deformed.

According to another embodiment, the crown reinforcement comprises two working crown layers, comprising circumferential reinforcers forming, with the circumferential direction, an angle of between 15° and 35° and which are crossed from one layer to the next. Such a crown reinforcement contributes to the generation of lateral thrust by the tire, particularly in curves.

A crown reinforcement may also combine two working crown layers comprising circumferential reinforcers forming, with the circumferential direction, an angle of between 15° and 35°, crossed from one layer to the next and a circumferential crown layer comprising circumferential reinforcers forming, with the circumferential direction, an angle at most equal to 5°.

The reinforcers of a crown layer are made of textile, preferably of polyester or of nylon, or are made of metal. Like with the carcass reinforcing layers, textile materials are commonly used in the field of tires for motorbikes because of the advantageous compromise between their performance and their cost of manufacture. However, the use of materials with higher elastic moduli and higher rupture strengths may prove necessary for mechanically engineering the crown reinforcement. Aramid or metal can be used for this purpose.

The radial outer end of the turn-up of the carcass layer with a turn-up may advantageously be in contact with at least one crown layer over a certain length of overlap so that the axial width of the crown portion of the carcass layer may be comprised between 0.3 times and 0.9 times the width of the tread. This length of overlap between the turn-up and the carcass layer in contact has an impact on the width of the transition portion marking the transition between the lateral portion and the crown portion.

BRIEF DESCRIPTION OF THE DRAWINGS

Other advantageous features and details of the invention will become apparent hereinafter from the description of the invention with reference to FIGS. 1 and 2 which depict:

In order to make them easier to understand, FIGS. 1 and 2 are not drawn to scale.

DETAILED DESCRIPTION OF THE DRAWINGS

Figure 1:
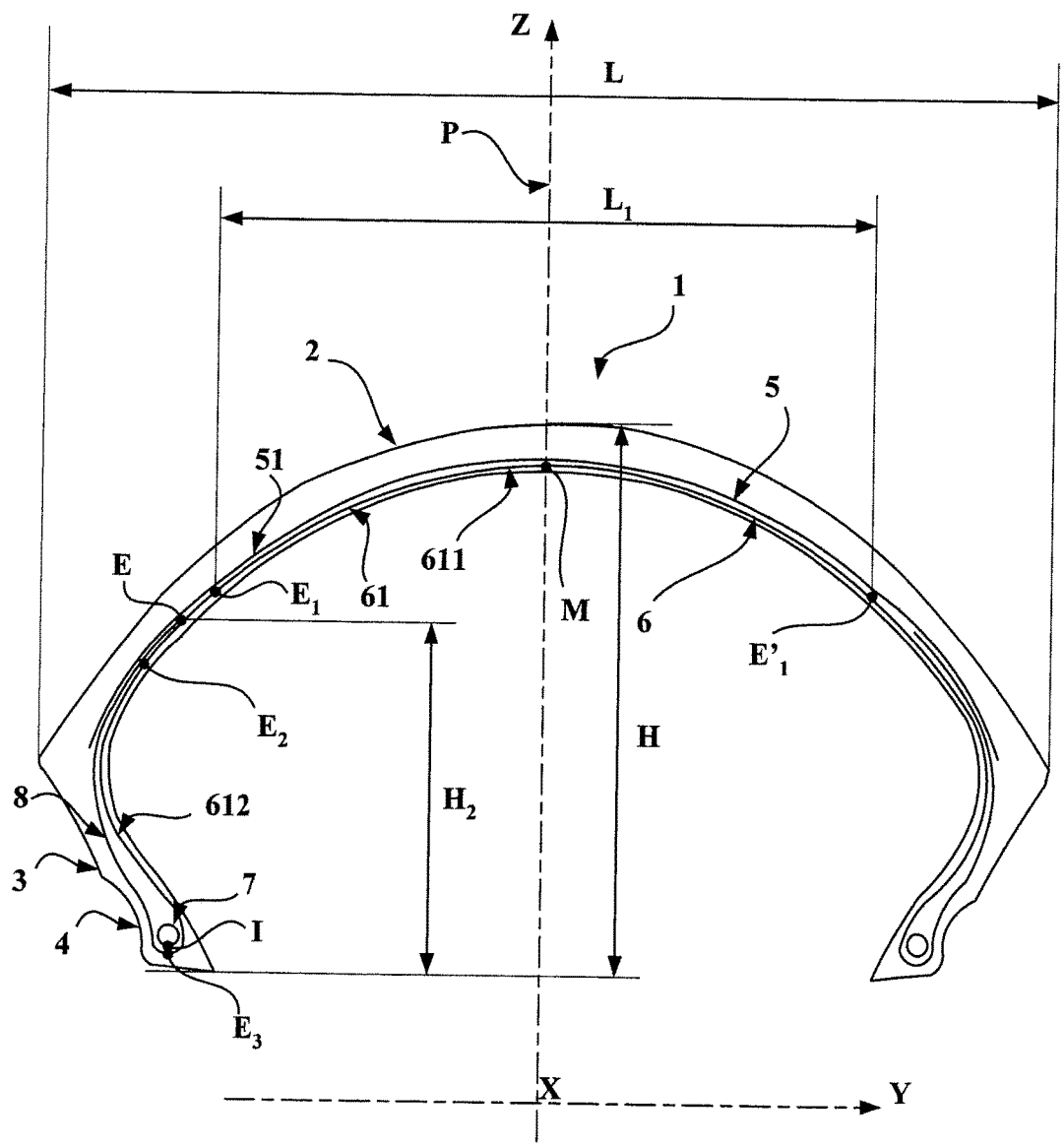
FIG. 1, a meridian section of a tire.

FIG. 1 depicts a tire 1 comprising a tread 2 connected by two sidewalls 3 to two beads 4, a crown reinforcement 5, radially on the inside of the tread 2, comprising at least one crown layer 51, a carcass reinforcement 6, radially on the inside of the crown reinforcement 5, comprising at least one carcass layer with turn-up 61. The carcass layer with turn-up 61 comprises reinforcers with are mutually parallel and turned up, within each bead 4, from the inside towards the outside of the tire, around a bead wire 7 to form a turn-up 8.

The crown portion 611 of the carcass layer with a turn-up 61 extends axially between a first and a second end $E_1$ and $E'_1$ which are symmetric about the equatorial plane P, over an axial width $L_1$ comprised between 0.3 times and 0.9 times the axial width L of the tread as defined between the two axial ends of the tread surface. The crown portion 611 is thus centred with respect to the equatorial plane P of the tire, defined by the respectively circumferential X and radial Z directions.

The transition portion marking the transition between the crown portion and the lateral portion is delimited by the points $E_1$ and $E_2$.

The lateral portion 612 of the carcass layer with a turn-up 61 extends, in the sidewall 3, radially toward the inside, from a radially outermost first end $E_2$, radially on the inside of the free end of the turn-up E, to a radially innermost second end $E_3$ radially on the inside of the radially innermost point I of the bead wire 7. It also extends axially on the inside of the turn-up 8. The radial height $H_2$ between the first and second ends $E_2$ and $E_3$ is comprised between 0.5 times and 0.9 times the design section height H, measured between the point, on the tread surface, that is positioned in the equatorial plane, and the radially innermost point of the bead 4.

The turn-up 8 extends radially outwards from the radially innermost end $E_3$ of the lateral portion 612 as far as the free end E of the turn-up 8.

Figure 2:
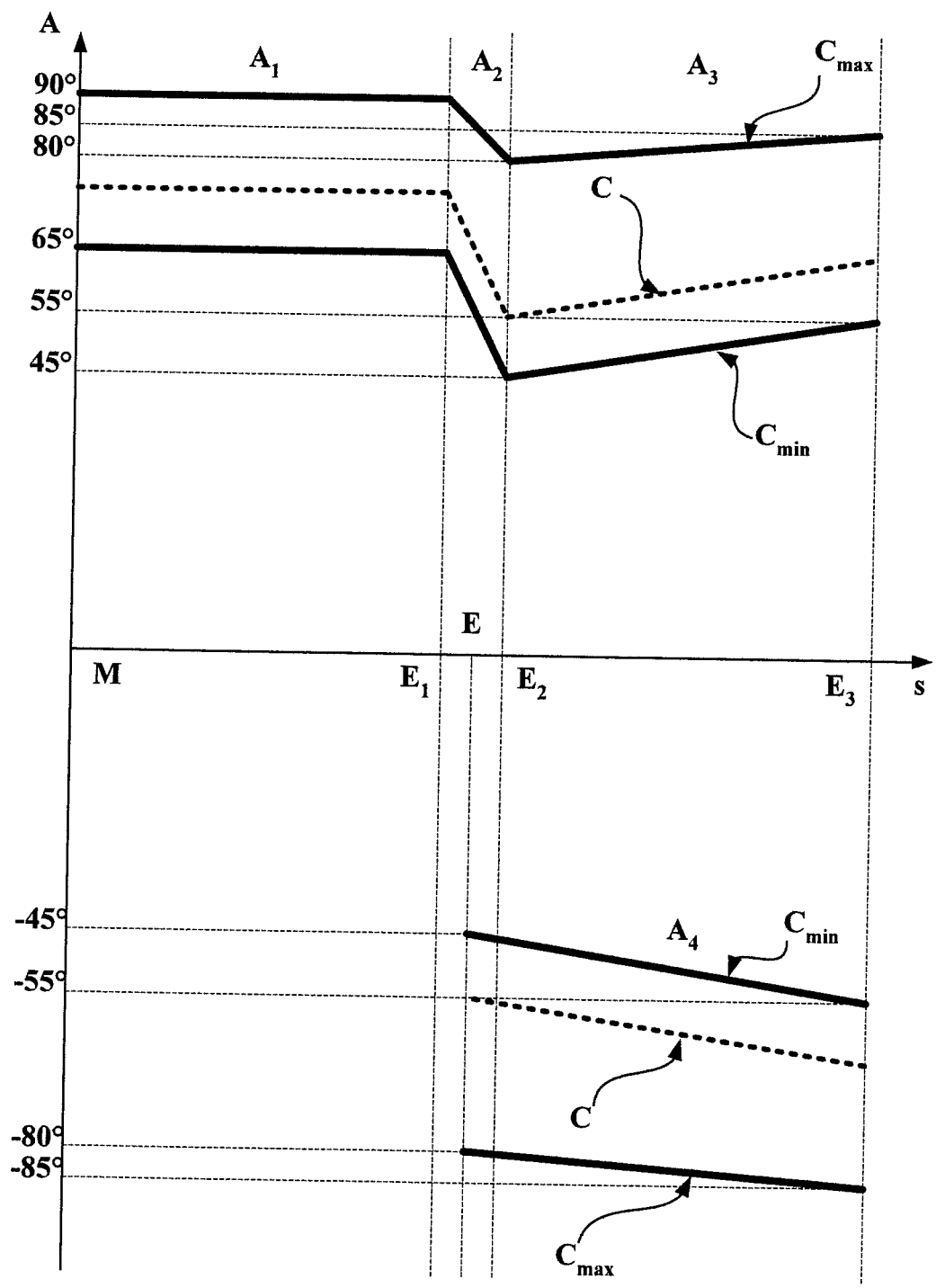
FIG. 2, the graph representing the range of change of the angle formed, with the circumferential direction, by the reinforcers of the carcass layer with a turn-up along its curved abscissa comprised between the equatorial plane and the end of the turn-up.

FIG. 2 shows the range of change of the angle A formed, with the circumferential direction X, by the reinforcers of the carcass layer with a turn-up, as a function of the curved abscissa value s, comprised between the point M of the equatorial plane and the end E of the turn-up. The curve $C_{max}$ is the envelope curve of maximum angle. The curve $C_{min}$ is the envelope curve of minimal angle. The curve C is a standard example of how the angle changes, as a function of the curve abscissa value along the carcass layer with a turn-up. Positive values for the angle correspond to the changes in the angle respectively along the crown portion, the transition portion and the lateral portion. Negative values for the angle correspond to changes in the angle along the turn-up.

The first portion of the range of change corresponds to that part of the crown portion 611 that is comprised between the points M and $E_1$, for which the reinforcers form, with the circumferential direction X, a substantially constant angle $A_1$ comprised between 65° and 90°.

The second portion of the range of change corresponds to the transition portion comprised between the end $E_1$ of the crown portion and the radially outermost end $E_2$ of the lateral portion 612, for which portion the reinforcers form, with the circumferential direction X, a decreasing angle $A_2$.

The third portion of the range of change corresponds to the lateral portion 612 comprised between the ends $E_2$ and $E_3$ which are respectively the radially outermost and the radially innermost ends, for which portion the reinforcers form, with the circumferential direction X, an angle $A_3$ that increases, from the radially outermost first end $E_2$ to the radially innermost second end $E_3$, from an angle at least 5° smaller than the substantially constant angle $A_1$ formed, with the circumferential direction, by the reinforcers of the crown portion 611.

The fourth portion of the range of change corresponds to the turn-up 8 in which the reinforcers form, with the circumferential direction X, an angle $A_4$, the opposite of the angle $A_3$, formed by the reinforcers of the lateral portion 612. This angle $A_4$, of opposite sign to the angle $A_3$, decreases, in terms of absolute value, from a maximum angle of between 55° and 85° at the radially innermost end $E_3$ of the lateral portion 612 until it reaches a minimum angle of between 45° and 80° at the end E of the turn-up.

The invention has been studied more specifically for the 190/55 ZR 17 size. In that particular case, the substantially constant angle $A_1$ of the reinforcers of the crown portion which extends axially over a width $L_1$ equal to 138 mm, namely 0.71 times the width of the tread which is equal to 194 mm, is equal to 80°. The angle $A_3$ of the reinforcers in the lateral portion, which extends radially over a height $H_2$ equal to 0.65 times the design section height H equal to 104.5 mm, increases from 62° at the point $E_2$ to 70° at the point $E_3$.

For this size studied, the reinforcers of the carcass layer with turn-up are made of nylon, while the reinforcers of the circumferential crown layer are made of aramid.

The cornering stiffness of this size was compared against the respective cornering stiffnesses of a first reference size $R_1$ and of a second reference size $R_2$. The first reference size $R_1$ comprises a carcass reinforcement made up of a single carcass layer at 90° and a crown reinforcement made up of a single circumferential crown layer. Reference $R_1$ is the reference with straight-line stability. The second reference size $R_2$ comprises a carcass reinforcement made up of two carcass layers at 65° which are crossed, and a crown reinforcement made up of a single circumferential crown layer. The reference $R_2$ is the reference for cornering stability.

The results obtained are set out in Table 1 below:

TABLE 1

|  | Reference $R_1$ | Reference $R_2$ | Invention |
|---|---|---|---|
| Cornering rigidity for zero camber angle | 100 | 110 | 100 |
| Cornering rigidity for a camber angle of 30° | 100 | 120 | 120 |

The dimension under study exhibits cornering rigidity levels that are at least equivalent to the best-performing reference, whether they are in a straight line with zero camber angles or in a curve with a high camber angle. It displays a cornering stiffness that is somewhat low in a straight line and somewhat high under cornering.

The invention must not be interpreted as being limited to the description of the examples above and notably extends to cover tires that may comprise carcass reinforcements in which no carcass layer has a turn-up. The lateral portion of carcass without a turn-up is then axially on the inside not of a turn-up but of a independent carcass layer portion anchored in the bead.

The invention claimed is:

1. A tire for a motorized two-wheeled vehicle of the motorbike type, comprising:
   a tread connected by two sidewalls to two beads;
   a crown reinforcement, radially on the inside of the tread, comprising at least one crown layer;
   a carcass reinforcement, radially on the inside of the crown reinforcement, comprising at least one turned-up carcass layer;
   the turned-up carcass layer comprising mutually parallel reinforcers turned up, within each bead, from the inside towards the outside of the tire around a bead wire, to form a turn-up comprising a free end;
   the turned-up carcass layer comprising a crown portion and a lateral portion;
   the crown portion extending axially between a first and a second end which is symmetric about the equatorial plane of the tire, wherein the crown portion has an axial width at least equal to 0.3 times and at most equal to 0.9 times the width of the tread;
   the lateral portion extending radially inwards, from a radially outermost first end, radially on the inside of the free end of the turn-up, as far as a radially innermost second end, radially on the inside of the radially innermost point of the bead wire, the free end arranged between a respective end of the crown portion and the radially outermost first end of the lateral portion;
   wherein the reinforcers of the crown portion form, with the circumferential direction, a substantially constant angle at least equal to 65°, wherein the reinforcers of the lateral portion form, with the circumferential direction, an angle that increases, from the radially outermost first end to the radially innermost second end from an angle at least 5° smaller than the substantially constant angle formed by the reinforcers of the crown portion, and wherein the reinforcers of the turn-up form, with the circumferential direction, an angle which is equal in terms of absolute value to, but of opposite sign from, the angle formed by the reinforcers of the lateral portion.

2. The tire according to claim 1, wherein the substantially constant angle formed, with the circumferential direction, by the reinforcers of the crown portion, is at least equal to 80°.

3. The tire according to claim 1, wherein the angle formed, with the circumferential direction, by the reinforcers of the lateral portion, increases from a minimum angle of between 45° and 80°, to a maximum angle of between 55° and 85°.

4. The tire according to claim 1, wherein the lateral portion has a radial height at least equal to 0.5 times and at most equal to 0.9 times the design section height of the meridian section of the tire.

5. The tire according to claim 1, wherein the reinforcers of a carcass layer are made of textile.

6. The tire according to claim 1, wherein the crown reinforcement comprises a circumferential crown layer comprising circumferential reinforcers forming, with the circumferential direction, an angle at most equal to 5°.

7. The tire according to claim 1, wherein the crown reinforcement comprises two working crown layers, comprising circumferential reinforcers forming, with the circumferential direction, an angle of between 15° and 35° and which are crossed from one layer to the next.

8. The tire according to claim 1, wherein the reinforcers of a crown layer are made of textile, or are made of metal.

9. The tire according to claim 1, wherein the reinforcers of a carcass layer are made of polyester or of nylon.

10. The tire according to claim 1, wherein the reinforcers of a crown layer are made of polyester or of nylon.

* * * * *